June 30, 1942. J. A. FORNEY 2,288,130
UPHOLSTERY CUSHION
Filed Sept. 20, 1938 3 Sheets-Sheet 1

Inventor
James A. Forney
By Edwin D. Jones
Attorney

June 30, 1942. J. A. FORNEY 2,288,130
UPHOLSTERY CUSHION
Filed Sept. 20, 1938 3 Sheets-Sheet 2
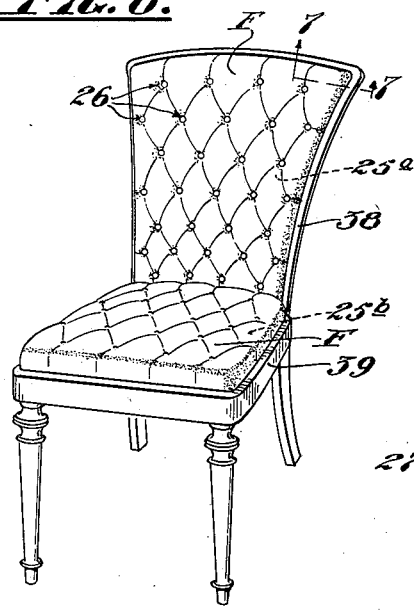
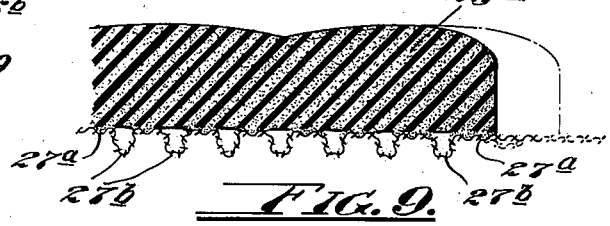
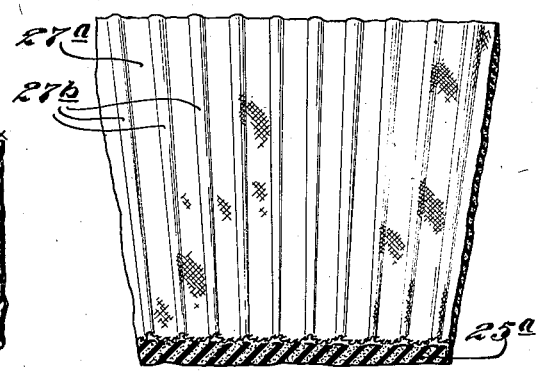
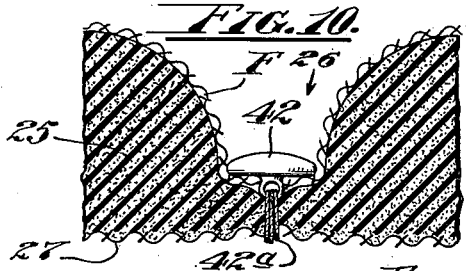
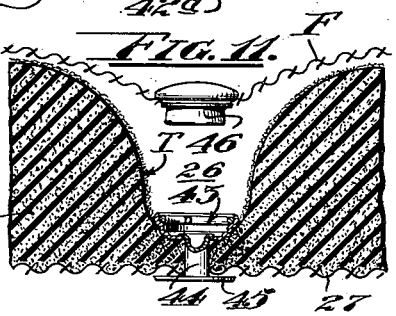
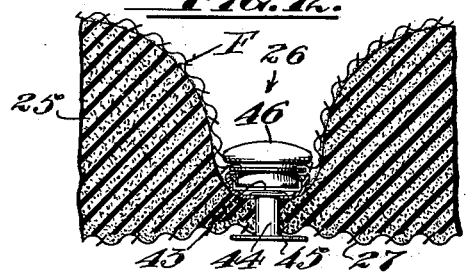
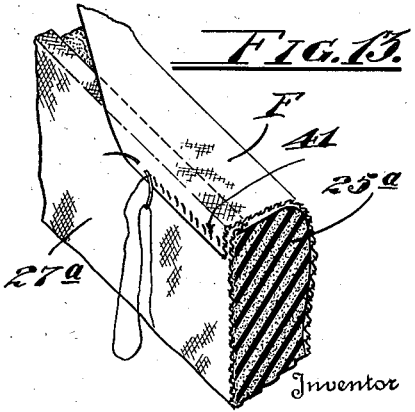
Inventor
James A. Forney
By Edwin D. Jones.
Attorney June 30, 1942. J. A. FORNEY 2,288,130
UPHOLSTERY CUSHION
Filed Sept. 20, 1938 3 Sheets-Sheet 3
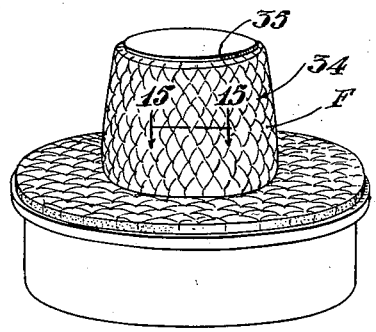
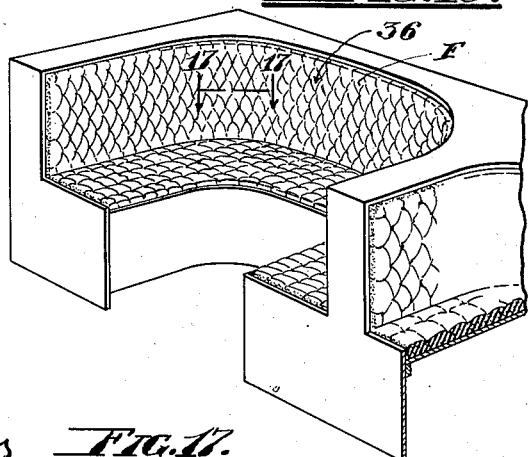
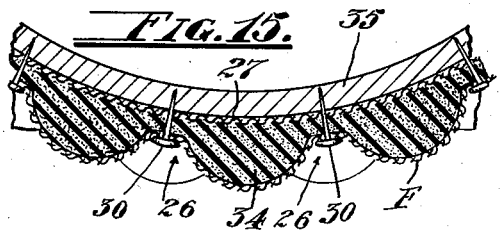
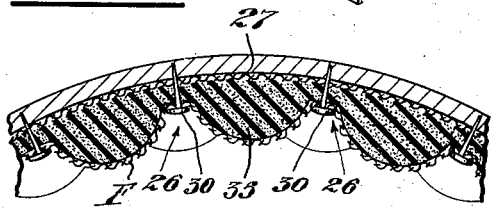
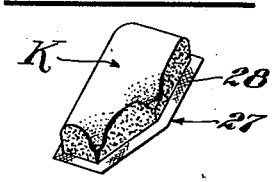
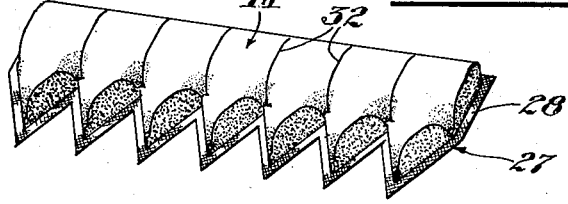
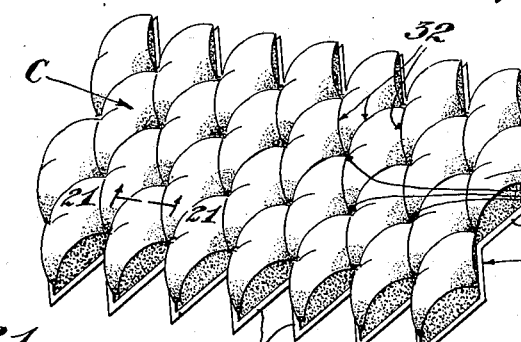
Inventor
James A. Forney
By Edwin D. Jones
Attorney Patented June 30, 1942

2,288,130

UNITED STATES PATENT OFFICE 2,288,130

UPHOLSTERY CUSHION

James A. Forney, Los Angeles, Calif.

Application September 20, 1938, Serial No. 230,793

11 Claims. (Cl. 155—179)

My invention relates to upholstery cushions used for seats and backs for furniture, a decoration for foot and headboards for beds, or as a decoration or covering for walls, and it has particular reference although not necessarily, to such cushions which are of tufted form.

It is a purpose of my invention to provide a tufted upholstery cushion which comprises a body of tufted form constructed of sponge rubber or any similar elastic material having the requisite resiliency and adapted to be molded or otherwise formed as a one piece or integral body and in any definite pattern as to size, shape and design of tuft, and which has associated therewith a fabric backing in the form of a sheet of canvas or similar material which serves the purpose of restricting the elasticity of the cushion in a manner to give permanent form thereto; a substantial means by which the cushion can be securely tacked to furniture frames; and providing a strong and practical tie-off for the tufting buttons employed to hold a finish cover of fabric in covering relation to the tufted side of the cushion.

It is also a purpose of my invention to provide an upholstery cushion of the character above described, wherein the cushion is formed with incisions or slots in which the excess portions of the finish covering occurring between the tufts may be extended and held to cause the finish covering to lie smoothly on the entire tufted surface of the cushion, and without the necessity of stitching as is the present practice.

Another purpose of my invention is the provision of separable fasteners, the parts of which are permanently associated with the cushion and the finish covering respectively, yet detachable one from the other for the dual purpose of allowing quick detachment and attachment of the covering in the manner of a slip cover, and when detached from the cushion permitting cleaning thereof or the substitution of a new covering when required.

Another purpose of my invention is the provision of an upholstery cushion of composite form, that is, the cushion is made up of a plurality of units adapted to be assembled in the formation of a single cushion of any desired shape and size to cover surface of any particular area and configuration.

Another purpose of my invention is the provision of an upholstery cushion in which the backing fabric is permanently secured to the cushion at intervals in a manner to provide intervening gathers or folds of the fabric, whereby the backing permits stretching of the cushion in the plane thereof so that it can be shaped to furniture frames of irregular form and permanently held in such form on the frames.

Another purpose of my invention is the provision of an upholstery cushion having resilient plugs placed between the finish cover and the body of the cushion to fill and thus level off the cushion at predetermined points of tuft, whereby the tufting design of the cushion as a whole may be varied as to size, arrangement and shape of tuft.

In the accompanying drawings which illustrate various embodiments and uses of my invention:

Fig. 6 is a perspective view showing a chair having applied thereto seat and back cushions constructed in accordance with my invention.

Fig. 7 is an enlarged sectional view taken on the line 7—7 of Fig. 6.

Fig. 8 is a view similar to Fig. 7 but showing the cushion removed from the chair frame and in normal or non-stretched form.

Fig. 9 is a sectional perspective view of the cushion shown in Fig. 8 and looking at the backing sheet thereof.

Fig. 10 is an enlarged fragmentary section of the cushion showing one method of securing the finish covering to the cushion.

Fig. 11 is a view similar to Fig. 10 showing another method of securing the finish covering to the cushion, and wherein the parts of the fasteners are separated to illustrate the detachability of the cover.

Fig. 12 is a view similar to Fig. 11 showing the fastener parts in cover securing position.

Fig. 13 is a sectional perspective view of the back cushion of Fig. 7 illustrating the mode of stitching the cover to the backing sheet.

Fig. 14 is a view showing in perspective an ottoman having my cushions applied thereto.

Fig. 15 is an enlarged section taken on the line 15—15 of Fig. 14.

Fig. 16 is a view showing in perspective a lounging booth having my cushions applied thereto.

Fig. 17 is an enlarged sectional view taken on the line 17—17 of Fig. 16.

Fig. 18 is a detail perspective view of one of the corner cushion units shown in Fig. 1.

Fig. 19 is a detail perspective view of one of the marginal cushion units shown in Fig. 1.

Fig. 20 is a detail perspective view of one of the center cushion units shown in Fig. 1.

Fig. 21 is an enlarged sectional view taken on the line 21—21 of Fig. 20.

Similar reference characters refer to similar parts in each of the several views.

My invention in any one of the several embodiments illustrated herein, is characterized by an integral or unitary cushion made of an elastic resilient and homogeneous material, such as sponge rubber, with or without tufts on its front side, and a sheet of fabric, such as canvas, permanently secured as by vulcanizing to the back of the cushion and functioning to limit stretching of the cushion in the plane thereof, to such degree as to give permanent overall dimensions to the cushion, so that in its adaptation to furniture or walls its application is not only facilitated, particularly when applying a plurality of cushions of different configurations in the formation of a composite cushion, but when once applied, each cushion is maintained by the fabric against stretching to a distorted form, and in the case of composite cushions the several units thereof are caused to properly and permanently fit one against the other to produce the effect of a single cushion.

In my invention two forms of cushions are embodied, namely, a single cushion of a size for chair seats or backs, and a composite cushion made up of a plurality of cushion units which may be varied as to number and form for covering surfaces of large area, such as ottomans, lounging booths and walls.

Figure 1:
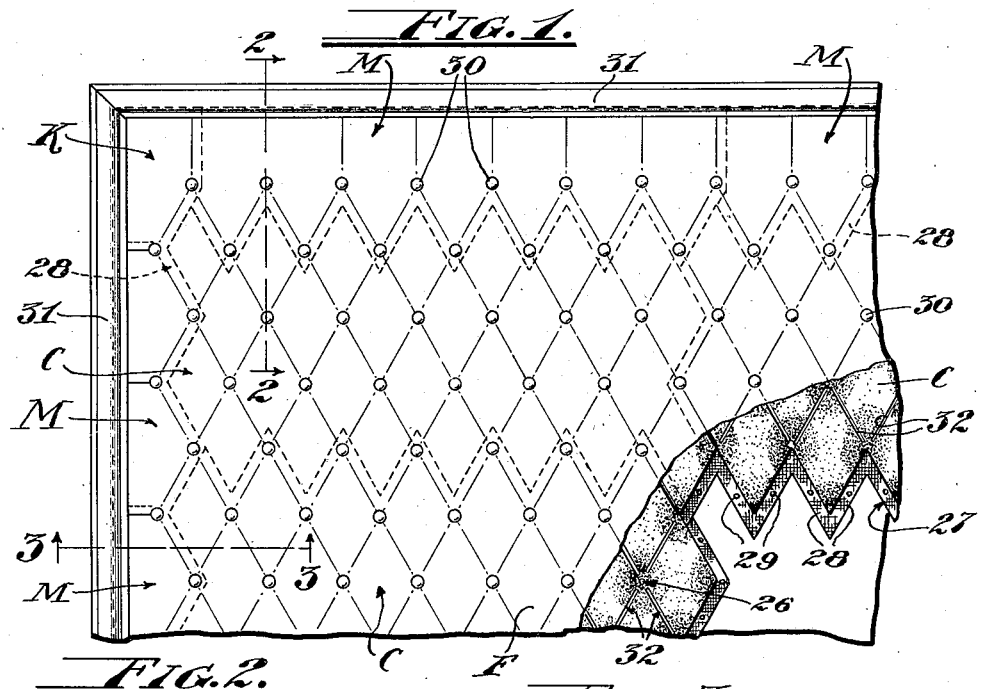
Figure 1 is a fragmentary view showing in side elevation one form of composite cushion embodying my invention in its use as a wall covering or decoration, and in applied position on a wall.
Figure 2:
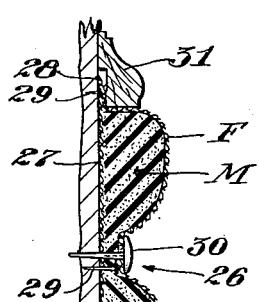
Fig. 2 is an enlarged vertical sectional view taken on the line 2—2 of Fig. 1.
Figure 3:
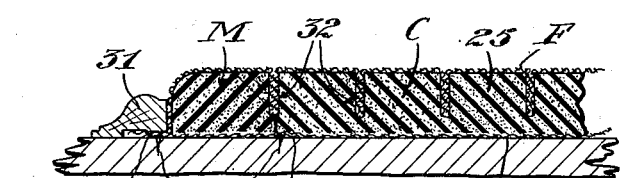
Fig. 3 is a horizontal sectional view taken on the line 3—3 of Fig. 1.

In Figs. 18 to 21 I have shown one combination of cushion units embodying the composite form of cushion, and in Figs. 1 to 3 the composite cushion is shown applied to a wall, it being understood that additional units have been added to cover the area of wall illustrated.

As shown in Fig. 20 one of the center cushion units, indicated at C, comprises a unitary body 25 of sponge rubber so molded as to form at its front side a multiplicity of tufts 26, and a flat back or rear side to which is vulcanized throughout its entire area a sheet of fabric 27, such as canvas. In the present instance, the tufts 26 are of diamond shape, and hence, the edges of the body 25 are of staggered configuration to preperly interfit with the edges of adjacent units in the formation of a composite cushion, which when layed on a wall, appears as a single cushion.

The backing sheet 27 is of such size as to project beyond the edges of the cushion unit and to thus form attaching strips 28 through which tacks 29 (Fig. 2) are adapted to be driven for attaching the unit to a wall.

In Fig. 19 is shown one of the marginal cushion units indicated at M, which is constructed in the same manner and of the same materials as the center unit C, but of a configuration to interfit with the edges of adjacent center units and form the margin of the composite cushion, except at the corners where corner units K (Fig. 18) are employed and shaped to fit against the center and marginal units.

In the application of the composite cushion to a wall for the purpose of providing a decorative covering therefor, as many center, marginal and corner units are employed as are necessary to cover the entire wall or any portion thereof. Each unit is secured to the wall W (Figs. 1, 2 and 3) by laying it against the wall with the tufted side outwardly, and then tacking the strips 28 to the wall at as many points as are necessary to secure the unit securely to the wall. After any one unit is attached, the other units are successively applied in a like manner and so that the edges properly interfit one with the other, thus producing the effect of a single cushion with uninterrupted tufts. Where the strips 28 of one unit overlap those of adjacent units, they may be turned under rather than tacked to the wall.

With the several units applied to the wall as described, a finish cover F of leather or fabric may be applied to and secured in tufted form on a composite cushion by the employment of tufting nails 30 which are driven through the covering and cushion and into the wall, as best shown in Fig. 2. The edges of the covering F may be folded beneath a molding 31 nailed to the wall at the edges of the cushion.

As will be appreciated by those skilled in the art of upholstery, it is the common practice to fold under and stitch those excess portions of covering material occurring between the points of tuft, in order to cause the covering to smoothly follow the contour of the tufts. Such folding requires a high degree of skill and considerable time. In my invention, this material folding process is avoided by the provision in the body 25 of each cushion unit, incisions or slits 32 (Fig. 21) each of which extends part way between the points of tuft (Fig. 20). Into the slits the excess portions of covering may be quickly and easily inserted in the manner shown in Fig. 3, and under the tendency of the rubber to expand and close the walls of the slits, the walls contract and thus clamp the covering therein with sufficient security to prevent accidental removal thereof. Also, where the area of the composite cushion is such as to require more than one width of covering, the meeting edges of adjacent widths of covering may be cut in a zigzag form and then inserted into the slits and thus held by the cushion.

In Figs. 14 and 16 I have shown composite cushions constructed in accordance with my invention as applied to the seat and back of an ottoman and a lounging booth, respectively. In the instance of the ottoman the seat cushion may be made in segmental units, while the circular back cushion 34 is made up of units of arcuate form. Such arcuate units acquire their convex curvature by reason of the flexibility afforded by the sponge rubber body 25 and the fabric backing 27, it being understood that such flexibility permits each cushion unit to be so bent as to lie contiguous to the annular back 35 of the ottoman and to be secured thereto by the tacking strips 28. The finish covering F is secured on the cushion by driving the tufting nails through the cushion at the points of tuft, as illustrated in Fig. 15.

In the instance of the booth (Fig. 16), the composite cushion 36 for the seat is constructed of units so shaped and assembled as to completely cover the U-form of seat. The cushion for the booth back 36 is likewise made of suitably shaped cushion units, certain of which are of concave form, as shown in Fig. 17, to follow the curvature of the back, while the finish covering F is secured in place on the composite cushion by the tufting nails 30.

Figure 4:
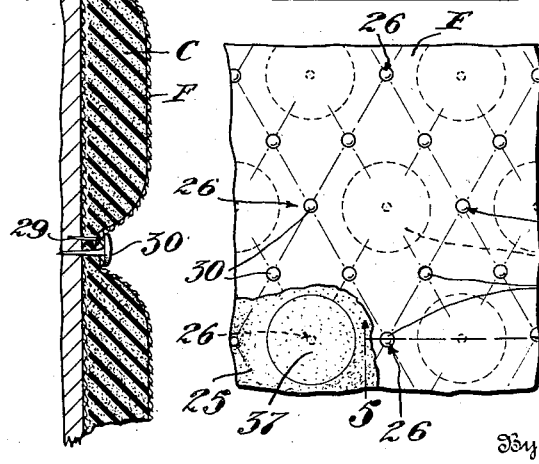
Fig. 4 is a fragmentary view showing in elevation another form of cushion embodying my invention.
Figure 5:
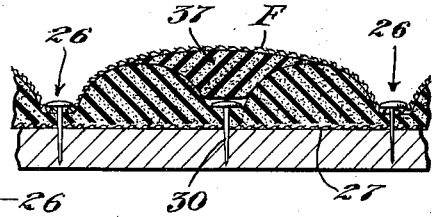
Fig. 5 is a sectional view taken on the line 5—5 of Fig. 4.

Referring now to Figs. 4 and 5, I have here shown a portion of any one of the cushion units provided with resilient filler plugs 37. These plugs are preferably formed of sponge rubber of the same density as the rubber forming the cushion body 25. Each plug is of such shape as to fill the depressions of any one tuft and to merge into the higher portions of the cushion so as to lend a rounded form thereto.

These filler plugs 37 are provided for the purpose of varying the configuration of the tufts of the cushion body, and as will be understood from a consideration of Fig. 4, with the plugs inserted into the tufting points of the cushion in the manner illustrated, the small diamond form of tufts are converted into tufts of large diamond form. The plugs are held in place on the cushion by the finish covering F which, as shown in Fig. 5, overlies each plug so that it is retained within the corresponding depression.

Referring now to Fig. 6, two single cushions 25a and 25b are illustrated, one for the chair back frame 38 and the other for the chair seat frame 39. The back and seat frames are shown as increasing in width from their point of juncture. Thus the cushions must increase in width correspondingly to properly fill the frames and in each instance such width increase is attained by stretching the body and securing it in this stretched form to the back or seat frame as the case may be.

As the construction and mode of application of each cushion 25a or 25b is the same description of one will suffice for both. As shown in Figs. 8 and 9, the sponge rubber body of the cushion 25a has secured to its back a sheet 27a of canvas or other fabric as by vulcanizing or cementing, but only at intervals in the direction of its width to form gathers or folds 27b which are unsecured to the body. By this method the rubber body can be stretched transversely to conform exactly to the shape of the back frame. Under such stretching the tufts 26 of the body will of necessity be enlarged and slightly distorted, but such enlargement and distortion are negligible for all practical purposes.

To secure the cushion to the chair frame a backing 40 of wood or other material is secured within the frame (Fig. 7), and to this backing the fabric sheet 27a is glued or cemented in extended form to maintain the cushion stretched as required.

Before applying the cushion to the chair as described a finish cover F is secured on the tufted side of the cushion at the points of tufting, and its marginal edges are extended around the edges of the cushion and stitched as at 41 to the sheet 27a in the manner illustrated in Fig. 13. Thus as illustrated in Figs. 6 and 7, the necessity of using gimp between the covered cushion and the chair frame, is eliminated because of the clean finish line of the cushion at its edges.

At the points of cushion tufting the cover F may be permanently secured to both the cushion and the backing sheet 27a with or without the gathers 27b by the method illustrated in Fig. 10. Here a tufting button 41 is connected to a length of twine 41a, and the twine is extended through the cushion and the backing sheet where it is tied off in the conventional manner. Such a method of securing the finish cover to the cushion is highly effective for the purpose as there is no possibility of the cover being torn loose from the cushion.

Referring now to Figs. 11 and 12, I have here shown part of a cushion constructed in accordance with my invention, which may be in the form of a unitary cushion or one of the units of the composite cushion. The cushion body 25 illustrated has its tufted side coated with a thin film of flock T (preferably cotton dust), which may be applied by blowing after covering the cushion surface with a suitable adhesive such as latex. This film covers up any imperfections in the cushion surface and provides a smooth and soft lining for the finish cover F to produce a soft appearance of the cushion as a whole.

Referring again to Figs. 11 and 12 means is disclosed for detachably securing the cover F in tufted form on the cushion body so that it may be easily and quickly applied or removed in the manner of a slip cover. Thus the cover when detached may be cleaned and then reapplied, or a new cover substituted if required.

The attaching means for the cover F comprises a separable fastener for each point of tuft, and in the present instance I have shown a snap type of fastener. This fastener comprises a female member having a socket 43 on one end of a shank 44, while on the other end of the shank is a flat head 45, and a male member comprising a head 46, adapted to be received by and detachably secured in the socket 43.

As shown, the female member is extended through and permanently secured in the cushion body at the point of tuft, the head 45 abutting the backing sheet 27 to confine the shank against pulling out of the cushion. The male member is permanently secured in the cover F so that when it is pushed down from the position shown in Fig. 11 to the position shown in Fig. 12 the head 46 will engage within the socket 43 and secure the cover within the tuft. Conversely, the male member is readily disengageable from the female member by exerting the necessary pull on the cover, and thus the cover can be detached from the cushion body.

I claim:

1. An upholstery cushion, comprising; a unitary body of sponge rubber one side of which is shaped to form tufts; a sheet of fabric secured to the other side of said body; a cover for the tufted side of said body; buttons at the points of tufting; and twine for each of the buttons connected thereto and extended through said body and said sheet and secured to said sheet.

2. An upholstery cushion, comprising; a unitary body of sponge rubber one side of which is shaped to form tufts; a sheet of fabric secured to the other side of said body; a cover for the tufted side of said body; and separable fasteners for securing the cover on the body at the points of tufting, each fastener including a member permanently secured in said body and said sheet, and a second member permanently secured to said cover and having detachable engagement with the first mentioned member.

3. An upholstery cushion, comprising; a unitary and homogeneous body of elastic and resilient material one side of which is shaped to form tufts; and a sheet of fabric secured to the other side of said body at spaced intervals and gathered between the points of securing thereby allowing stretching of said body.

4. An upholstery cushion, comprising; a resilient homogeneous body one side of which is shaped to form tufts of a definite size and shape; and resilient members adapted to be placed on the body at the points of tufting for filling the latter, whereby the size and shape of the tufts can be varied.

5. An upholstery cushion, comprising; a resilient homogeneous body one side of which is shaped to form tufts of a definite size and shape; a cover for the tufted side of said body; means for securing the cover to said body at predetermined points of tufting; and resilient fillers for the body beneath the cover at the unsecured points of tufting for so supporting the cover at such points as to give to the covered cushion a permanent tufted form different from that of the body.

6. An upholstery cushion, comprising; a unitary resilient body having one side shaped to form tufts, and slits in the tufted side adapted to receive and secure those excess portions of a covering for the tufted side, which occur between the points of tufting.

7. A composite cushion for upholstery, comprising; a plurality of unitary and homogeneous bodies of resilient material, each body having one side of permanently tufted form, and the tufts of one body matching those of the other to form when the bodies are assembled in edge to edge relation a single cushion of one design of tuft; a backing sheet of fabric for each of the bodies permanently secured thereto and projecting from the edges thereof to provide tacking strips by which the bodies can be secured in assembled form to a support.

8. An upholstery cushion, comprising: a resilient homogeneous body one side of which is shaped to form tufts of a definite size and shape; and members adapted to be placed on the body at the points of tufting for filling the latter, whereby the size and shape of the tufts can be varied.

9. An upholstery cushion, comprising: an imperforate body of sponge rubber having one side flat and the other side formed with protuberances and depressions, portions of said body between the protuberances serving as closures for the bottoms of the depressions; and fastening elements anchored in the closures and operatively exposed in the bottoms of the depressions for engagement with companion fastening elements on a cover to secure the cover in tufted form on the body.

10. A composite cushion or mat, comprising; a plurality of unitary and homogeneous bodies of resilient material, each body having one side of a form to provide tufts of diamond shape, the confronting edges of the bodies being serrated so as to interfit one with the other in the production of a single cushion or mat of diamond shaped tuft.

11. A composite cushion or mat, comprising; a plurality of unitary and homogeneous bodies of resilient material, each body having one side of a form to provide tufts of diamond shape, the confronting edges of the bodies being serrated so as to interfit one with the other in the production of a single cushion or mat of diamond shaped tuft; and tacking strips of fabric secured to the back of each of said bodies and projecting uniformly from the edges thereof, by which said bodies including said serrated edges can be tacked in assembled form on a support.

JAMES A. FORNEY.